Sept. 7, 1965 H. A. ANDERSON ETAL 3,205,317

SLIDING SWITCH DEVICES FOR CODING APPARATUS

Original Filed Dec. 13, 1956 3 Sheets-Sheet 1

INVENTORS
BY HILDING A. ANDERSON
CLAYTON H. CLARK
Strauch, Nolan & Neale
ATTORNEYS

SLIDING SWITCH DEVICES FOR CODING APPARATUS

Original Filed Dec. 13, 1956 3 Sheets-Sheet 2

INVENTORS
BY HILDING A. ANDERSON
CLAYTON H. CLARK
Strauch, Nolan & Neale
ATTORNEYS

SLIDING SWITCH DEVICES FOR CODING APPARATUS

Original Filed Dec. 13, 1956 3 Sheets-Sheet 3

INVENTORS
HILDING A. ANDERSON
CLAYTON H. CLARK
BY Strauch, Nolan & Neale
ATTORNEYS 3,205,317

SLIDING SWITCH DEVICES FOR CODING APPARATUS

Hilding A. Anderson, Lake Zurich, and Clayton H. Clark, Mundelein, Ill., assignors to SCM Corporation, New York, N.Y., a corporation of New York

Original application Dec. 13, 1956, Ser. No. 628,110, now Patent No. 2,982,810, dated May 2, 1961. Divided and this application Apr. 11, 1961, Ser. No. 102,220
15 Claims. (Cl. 200—5)

This application is a division of copending application Serial No. 628,110, filed December 13, 1956, now United States Patent No. 2,982,810 issued May 2, 1961.

This invention relates to switch devices intended for use in electrical code data transmitting equipment and systems therefor and has particular reference to sliding contact switch bank devices for transmission and reception mechanism for such systems wherein is employed two condition code bits in combination form such as the well-known five unit Baudot code.

With the increasing use of interoffice telegraphy and integrated data processing systems, it is advantageous to transmit the units of a code group in simultaneous form over a plurality of wires. By using simultaneous transmission, less complex and higher speed translators can be used at the various receiving machines.

The structure disclosed in parent application Serial No. 628,110 includes keyboard transmitting equipment that can transmit the units of a code in sequential arrangement and simultaneous arrangement, the components of the simultaneous portion including sliding contact switch devices in accord with the present invention. A translating mechanism capable of receiving and translating either form of signals, sequential or simultaneous, e.g., as transmitted by the keyboard transmitter, is incorporated for disclosure purposes in a reperforator structure, and utilizes a second embodiment of a sliding contact switch bank in accord with the present invention.

Accordingly, a primary object of this invention resides in the provision of a novel two-position, multi-pole switch bank, the multiple poles being capable of independent actuation.

Another object resides in the provision of a novel multi-pole, two-position sliding switch bank including a novel plug in printed circuit for the switch bank and novel sliding switch contacts.

A further object resides in the provision of a new multi-pole, two-position switch bank device, each pole capable of independent actuation and the switch bank including a novel sliding contact structure with a printed fixed contact circuit board.

It is also an object of this invention to provide such multi-pole two-position switches with novel common contacts enabling simultaneous energization of all circuits controlled by all switches.

Still another object resides in providing a novel mechanism in conjunction with the aforenoted sliding contact two-position switch banks enabling all switches in a bank to be locked in any combination of switch positions.

Further novel features and other objects of this invention will become apparent from the following detailed description, discussion and the appended claims taken in conjunction with the accompanying drawings showing preferred structures and embodiments, in which:

*General description*

Figure 1:
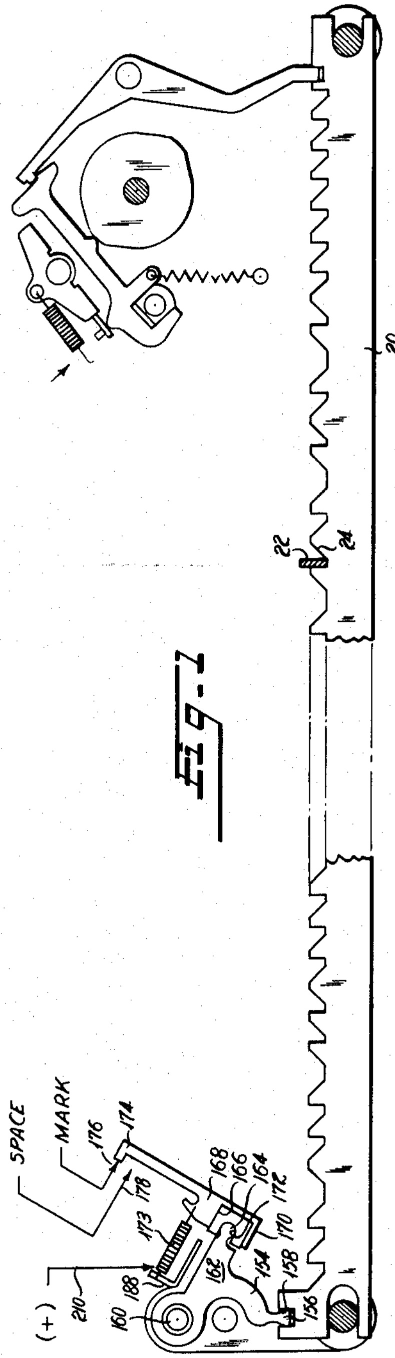
FIGURE 1 is a schematic delineation of the keyboard of this invention, illustrating both sequential and simultaneous transmitters, the latter including an embodiment of a sliding contact switch bank according to the present invention.

The switch bank embodiments of this invention can be utilized in many applications but are illustrated herein for use in telegraphic equipment such as a telegraph keyboard basically similar to that disclosed in E. E. Kleinschmidt et al. Patent No. 2,773,931, for Printing Telegraph Apparatus, excepting that the patent illustrates a sequential transmitter. As disclosed in the aforementioned patent, pressing of a key moves five permutation bars to either of their left and right hand positions indicative of "space" (no-current) and "mark" (current) conditions of the code. A sixth bar is invariably moved to the right by the pressing of a key and is instrumental in releasing a transmitter camshaft to make one half revolution. As the camshaft revolves, six cam lobes are presented in sequential order to six cam followers and the cam followers are conditioned, by the permutated positions of the code bars, to allow one or the other of their ends to be raised by the passage of the associated cam lobes. This selective raising of one or the other ends of a follower causes an electrical contact or no-current electrical conditions to be transmitted over a single wire line. Seven of these pulses make up a code signal for each of thirty-two different combinations; the first pulse is always one of no-current, the succeeding five pulses are permutatively selective and the seventh pulse is invariably a current pulse. After the camshaft has made one half revolution, in which time the seven pulses are transmitted, it is stopped and will be ready for the next key to be depressed for transmission of the next code signal. The speed of the transmitter camshaft is synchronized with the receptive speed of the associated telegraph equipment and is normally in the order of 60 words per minute. Using the transmitter, as briefly described above, sequential signals may be sent out on the line and the message may be monitored on a local page printing machine such as the one disclosed in aforementioned Patent No. 2,773,931.

It has been found that for more economical use of line time and for smoother operation of the receiving equipment, it is advantageous to store the messages produced by the keyboard for future transmission. Message storage can be accomplished in various ways, e.g., holes punched in a paper strip or magnetic spots on a steel tape. In accord with the invention in parent application Serial No. 628,110, storage of messages is performed by a perforator which prints a type character and punches code holes in the tape in accord with operation of the keyboard transmitter. The perforator has two coordinated receiving mechanisms, one of which is adapted to receive incoming sequential signals from a line and the other of which is adapted to receive simultaneous signals directly from the keyboard. The keyboard transmitter thus includes basic keyboard structure of the aforementioned U.S. Patent No. 2,773,931 and, in addition, the left side of the keyboard transmitter includes a simultaneous switch bank mechanism in accord with this invention, the switches of the switch bank being controlled by the movement of the code bars. Each code bar will slide a switch member of the switch bank to the left or right according to the code condition to simultaneously complete a group of permutated "mark" or "space" connections to a solenoid structure at the perforator, which is adapted to these simultaneous circuits and will operate to translate the code to mechanical conditions and record it on the tape.

The sequential receiver of the perforator disclosed in skeleton form includes a conventional single relay receiver with selecting levers, Y-levers and transfer T-levers similar to receiving structure shown in the above referred to Patent No. 2,773,931. The sequential receiver cooperates with associated mechanism to translate the incoming sequential pulses into simultaneous switch positions which in turn operate the simultaneous receiver of the perforator which has been briefly referred to, the simultaneous switch positions being enabled by a second form of sliding contact multi-pole switch bank.

*First switch bank embodiment*

The disclosed exemplary teletypewriter equipment uses the same general form of five-unit teletypewriter code for simultaneous operation which is used for sequential operation; however, time is not a factor. Changing the mechanical code bar setting of the keyboard to a simultaneous electrical setting is accomplished by closing electrical contacts to one circuit for a marking impulse and to a different circuit for a spacing impulse, with two circuits provided for each of the five code impulses.

The accommodate the two circuits for each of the five code impulses, an eleven-wire connection is required between a simultaneous sending unit and the simultaneous receiving unit. After the marking or spacing circuits for the five units of the code are closed, the circuits energize solenoids in a receiving mechanism to mechanically set the code combination for further operations not involved in this disclosure.

Simultaneous signals, originating at the simultaneous transmitter mechanism of the keyboard transmitter, are received only by simultaneous receiving mechanism of the perforator of the specific illustrated embodiment. This means of sending is used only when printing on and perforating tape to record messages originating at the keyboard transmitter. It is to be understood, however, that this invention is not limited to the specific illustrated structure shown, but may be used in other forms falling within the scope of the appended claims.

Now returning to FIGURE 1 as a reference, the origination of the simultaneous operation takes place at the left-hand side of the keyboard transmitter. The same code bars 20, which are used to set up the sequential code, set up the simultaneous code. The sequential signal is sent by the mechanism at the right-hand side to a signal line and the simultaneous signal is sent to the perforator. The sequential mechanism will not be described herein.

When a key lever 22 is depressed into notches 24, each code bar is shifted either to the left or to the right, depending on whether a marking or a spacing impulse is being set up. The movement of each code bar 20 pivots an associated corresponding switch arm 154 in a switch arm assembly at the left-hand side of the keyboard. Each arm 154 has a circular tip 156 which engages a notch 158 provided in the left-hand upper edge of the code bar 20. There are five switch arms 154 pivoted on the frame at 160 and these switch arms operate like bell cranks with a rightwardly projecting arm 162 having a circular tip 164 which is operatively associated with a slot 166 in a sliding switch member 168. If the code group requires the first impulse to be a marking impulse, the first code bar is shifted to the right, pivoting the first switch arm 154 to the right; if the second impulse is to be a spacing impulse, the second code bar is shifted to the left, pivoting the second switch arm to the left. The other three switch arms are positioned the same way.

The bell crank action of switch arms 154 causes projections 162 to assume upward and downward positions to move and position the five associated sliding switch members 168 accordingly. Sliding switch members 168 are made from material which is electrically conductive and are insulated from the arm projection 162 by a dielectric shoe 170 disposed in the aforedescribed slot 166. Each dielectric shoe 170 has a notch 172 to receive the circular tip 164 of switch arm projection 162. Each sliding switch member 168 is biased in a counterclockwise direction about the switch arm projection tip 164 as a pivot by springs 173 which press the sliding contact end 174 of member 168 against associated fixed contacts which will presently be described. All of the sliding switch members 168 are connected through their springs 173 to a common positive potential.

Figure 2:
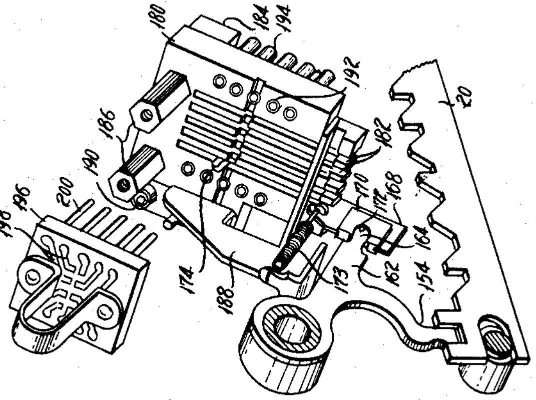
FIGURE 2 is a perspective view of the simultaneous transmitter switch (only one of the sliding contacts being shown) showing the connection linkage between one code bar and its associated sliding switch member.

With reference now to FIGURES 2 and 3(A, B and C), further details of the simultaneous switch will be described. The five sliding switch members 168 are guided in an insulating block 180 by channels 182. This block 180 is attached to a rigid boss 184 of the machine frame by screws 186. A bracket 188 to which the springs 173 are attached is also mounted on the block 180 by screws 190, only one of which can be seen. Bracket 188, being supported by the insulating block 180, is also insulated from the machine.

Figure 3A:
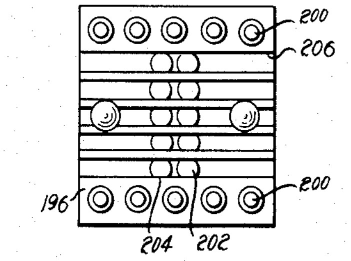
FIGURES 3A, 3B and 3C are, respectively, bottom, side, and top views of the switch plug-in printed circuit shown in FIGURE 2.
Figure 3B:
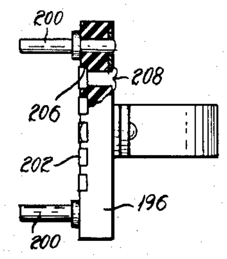
Figure 3C:
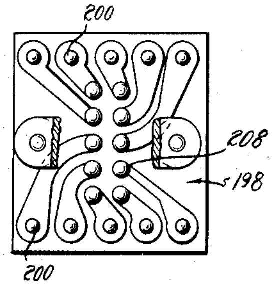

Five socket connectors 192 are fixed through the block 180 on each side of the group of channels 182 and each of the socket connectors 192 has a terminal 194 projecting out of the bottom of the block to provide two sets of five posts, to which are attached the five mark and five space circuit lines. In order to complete a connection between a contact tip 174 of a sliding switch member 168 and either a mark or a space terminal 194, there is provided a plug-in switching plate 196, details of which are illustrated in FIGURES 3A, 3B and 3C. The plate 196 is made of insulating material and has on its top surface, FIGURE 3C, a printed circuit generally indicated at 198. Two side rows of plug pins 200 are fixed through plate 196, and are projected out of the bottom in an arrangement permitting plug-in cooperation with socket connectors 192. The printed circuit 198 connects the ten plug pins 200 with ten contacts 202 arranged in two parallel lines of five across the center of the plate 196, FIGURE 3A. The bottom ends of contacts 202 have flattened edges 204 (FIGURE 3A) to prevent them from turning within slots 206 formed in the bottom of plate 196, and the bottom surfaces of contacts 202 are flush with the bottom of the plate. Pins 208 (FIGURES 3B and 3C), of which the contacts 202 are a part, project through the plate 196 where they make electrical contact with the printed circuit 198. It can thus be seen that when circuit plate 196 is plugged into the sockets 192 (FIGURE 5) the two transverse rows of contacts 202 will be positioned above the two positions of the sliding switch member contact tips 174 which are pressed against one or the other of associated ones of these contacts 202 by the resilient biasing force of springs 173, as has been previously explained.

It follows then that in the marking position, the sliding contact tip 174 of a sliding switch member 168 cooperates with an upper circuit on the switch plate 196. In the spacing position the sliding contact tip 174 cooperates with a lower circuit on the switch plate 196. Thus one circuit of the simultaneous transmitter mechanism is closed for marking impulses and one circuit is closed for spacing impulses for each of the five units of the code. The eleventh line 210 (FIGURE 1) is a common or return line for all ten circuits, connected to the sliding member spring bracket 188, as has been described.

After a coded group of the circuits in the simultaneous transmitter mechanism has been set up, such circuits are energized to send impulses through the five sliding switch members 168 and associated mark or space circuits to the receiving mechanism of the perforator. This is accomplished by a switch (not shown) behind the keyboard.

*Second switch bank embodiment*

Figures 6, 7:
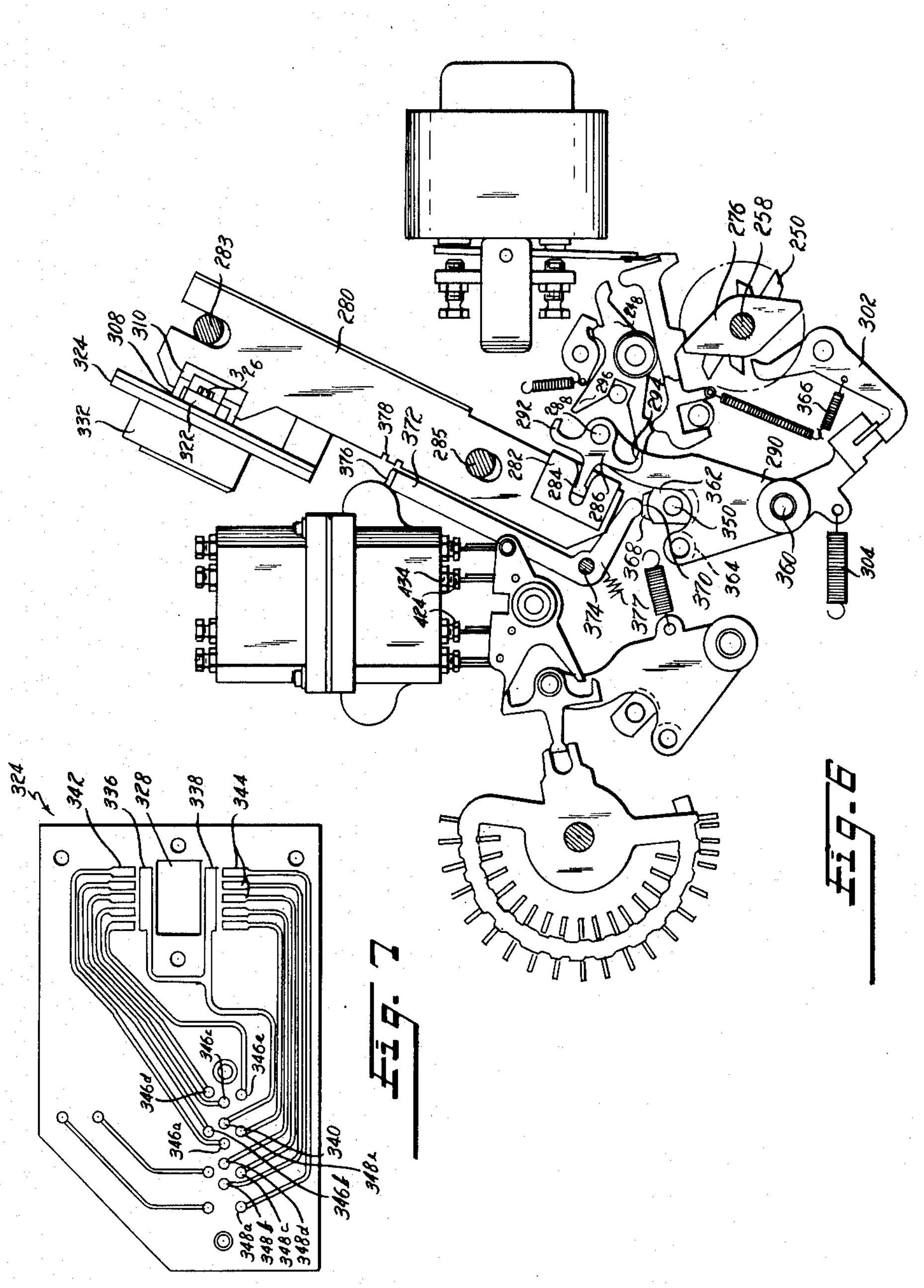
FIGURE 6 is an elevation view illustrating the various units of a printing perforator sequential and simultaneous receiving and selecting mechanism ulitizing the switch bank embodiment of FIGURES 4–6.
FIGURE 7 is a plan view of the printed circuit plate used with the contact structure of FIGURE 4.

The exemplary teletypewriter equipment includes a reperforator mechanism, shown in FIGURE 6, which utilizes a second embodiment of a sliding contact switch bank. Five dielectric code plates 280 of a code actuated switch must be positioned according to the incoming sequential code group in order to convert the sequential form of the code group to a simultaneous form to be received by five solenoids for subsequent conversion to printed and punched tape. Referring to FIGURE 6, an incoming code group, as stored in the Y-levers 248 by clockwise and counterclockwise settings, is transferred to the code plates 280 by mechanism to be now described.

Each code plate 280, at its lower end, carries a slotted metallic shoe 282 which mates with a corresponding tail 284 of one of five T-levers 286, all of which are mounted on a common pivot 288 carried on the end of a transfer lever 290. The five code plates 280 are mounted for reciprocation on two fixed posts 283 and 285 which pass through appropriate slots in the code plates. Turning a T-lever 286 on its pivot will cause its mating code plate 280 to move up or down. The T-levers are mounted in the same planes as their corresponding Y-levers, and movement of the transfer lever 290 engages certain ones of the ends of the T-levers 286 with certain ones of the ends of the Y-levers 248. The ends 292 and 294 of the arms of T-levers 286 are spaced farther apart than associated ends 296 and 298 of Y-levers 248. Therefore, only one end of the T-lever can engage one end of a Y-lever at any time and the ends which engage will depend upon Y-lever position. When the transfer operation takes place, the transfer lever 290 moves all of the T-levers against the Y-levers and the T-levers assume positions corresponding to associated Y-levers, thus transferring the five stored code settings of the Y-levers to the T-levers and thence to the code plates 280.

The transfer operation, a reciprocatory swinging movement of the transfer lever 290, takes place after the fifth code bit is stored in the Y-levers but before the selector camshaft 258 is brought to rest by the stop signal. A sixth or transfer lever latch tripping cam (not shown) mounted on the selector camshaft 258 trips a transfer lever trip latch 302 which holds transfer lever 290 in a left-hand position, and the transfer lever 290 is pulled clockwise by the transfer lever spring 304. The timing of the latch tripping cam with respect to the five selector cams 250 and stop plate 276 is such that the tripping action takes place only after the Y-lever selecting operation is completed and before the selector camshaft 258 is stopped.

Figure 5:
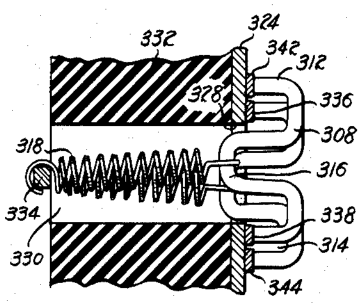
FIGURE 5 is a detail section view of the contact wipers and printed circuit board used with the contact structure shown in FIGURE 4.
Figure 4:
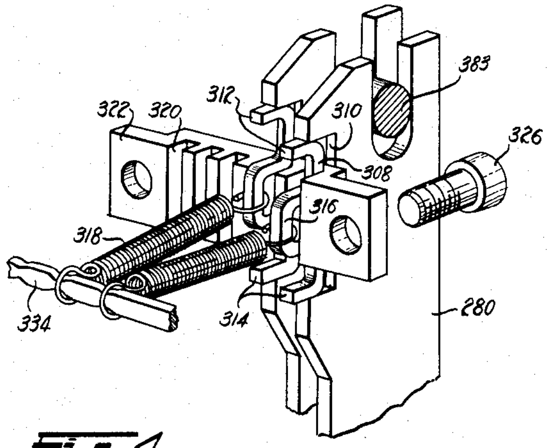
FIGURE 4 is a detail perspective view of part of a second sliding contact switch bank embodiment, showing the movable contact structure and part of the contact operating plates, this embodiment being arranged for use in a sequential and simultaneous receiving mechanism.

Each of the five code plates 280 is associated with one of five contact wipers 308, each of which is disposed in a cut-out 310 in the upper end of one code plate. With reference to FIGURES 4 and 5 for details, these contact wipers 308 are square in cross section and are bent in the shape of a W with the two ends 312 and 314 forming the wipers and the middle U-section 316 forming an anchor clip for a biasing spring 318. Each wiper 308 (FIGURE 4) slides within slot 320 of a guide block 322, one slot being provided for each wiper. Guide block 322 is fastened to a switch plate 324 by screws 326. The width of block 322 (FIGURE 4) is narrower than the cut-outs 310 in the ends of code plates 280 to permit unobstructed movement of the code plates when they slide into "mark" and "space" positions. Biasing springs 318, one for each wiper 308, pass through an opening 328 in switch plate 324, through a hole 330 in a backing block 332 and are attached to an anchor bar 334 located at the rear of the hole 330.

The printed circuit switch plate 324, FIGURE 7, has two contact strips 336 and 338, disposed adjacent opposite side edges of opening 328, which provide the common contacts of the simultaneous circuit. These common contact strips 336 and 338 are connected and terminate at a pin 340. The arm 312 of the wiper 308 is associated with the common strip 336 and the arm 314 is associated with the common strip 338, and one or the other of the wiper arms 312, 314 always rests on one or the other of the common strips when the wiper 308 is in spacing or marking position. The printed switch plate 324 also provides two more contacts for each contact wiper, one (342) above the strip 336 and one (344) below the strip 338. These contacts have printed circuits which terminate at pins 346*a, b, c, d* and *e*, and 348*a, b, c, d* and *e*. Thus when a code plate 280 is in the upper position (spacing), the lower arm 314 of the wiper 308 rides against the lower common contact strip 338 while the upper arm 312 rides against its associated contact 342, closing one circuit to the simultaneous selecting mechanism. In this manner, each code plate 280 closes one circuit if the impulse it represents is a marking impulse, or closes a different circuit if the impulse it represents is a spacing impulse.

A code actuated switch function shaft 350, FIGURE 6, performs three main functions: (1) it restores the transfer lever 290 and mechanism to its latched position; (2) it provides power to register and lock the code plates 280 in place and (3) it controls a switch which energizes the circuits of the simultaneous receiving mechanism, to be later described.

Function shaft 350 is driven in a counterclockwise direction through a toothed clutch at the right-hand end of the shaft. A spur gear carrying one part of the drive clutch is in constant rotation through its engagement with a driving gear on a power input shaft. The clutch is engaged when the transfer operation takes place and is accomplished by the clockwise turning of a clutch latch which, through a shaft 360, is connected to the transfer lever 290 and is rotated when the transfer lever latch 302 is actuated to release the transfer lever. Turning of clutch latch permits the clutch members to spring together and function shaft 350 starts to rotate. The T-levers 286 must be moved away from the Y-levers before the next code group can be set up in the Y-levers and this action is accomplished when the transfer lever 290 is restored to the latched position. The transfer lever 290 must be rotated slightly counterclockwise against the tension of the spring 304 and latched in this position by the transfer lever latch 302. A cam 362 at the left-hand end of the function shaft 350 operating on a roller 364, mounted on an extension arm of transfer lever 290, accomplishes this restoring action during a one-half revolution of the shaft 350 by camming the transfer lever 290 toward the restored position. Near the end of the one-half revolution, as the transfer lever moves into restored position, the transfer lever latch spring 366 pulls the transfer lever latch 302 into position to latch the transfer lever.

After the five code bits have been received by the sequential receiver, and the associated selector mechanism has caused the positioning of the five code plates 280, the plates 280 are registered and locked in place to align the contact wipers 308 in their exact correct selected positions. As illustrated, this function is performed by the interoperation of a cam 368 on the function shaft 350, a cam follower 370 on an extension of a registering lever 372, pivoted at 374, and having a registering bail 376 on a second extension. Registering lever 372 is biased clockwise by a spring 377. While the selection and transfer operations are taking place, the cam follower 370 rests on the high portion of the cam 368. The function shaft 350 is stationary during this time so the cam 368 is not rotating. When function shaft 350 is coupled to the drive gear 354 through clutch 352, so shaft 350 starts to rotate, the cam follower 370 drops off of the high portion of the cam 368 and the bail 376 moves up against notches 378 of the plates 280. The notches 378 are aligned with the upper notches of the mark positioned code plates in line with the lower notches of the space positioned code plates, so that the five notches are simultaneously engaged by the bail 376 of the lever 372. The notches 378 are V-shaped, and the bail 376 has a knife edge, hence slightly out-of-line code plates are cammed into place as the register bail 376 engages the notches.

To prevent arcing at the contacts of switch plate 324 when wipers 308 slide into their selected positions, the electric circuit to the common input of plate 324, which is received at the pin 340, is held in open condition. After the bail 376 positions and locks the plates 280, the simultaneous circuit is pulsed. A cam (not shown) on the function shaft 350 is associated with a pair of contacts (not shown) in series with the energizing circuit to the simultaneous receiving mechanism, and when the lobe of the cam strikes the contacts they will be closed to pulse the simultaneous code plate circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A two-position code switch bank with a plurality of independently operable two position switches comprising: a frame member with parallel grooves therein; a plurality of sliding contact members, each of which is slidably disposed in an associated one of said grooves; a printed circuit member having a plurality of pairs of aligned spaced contacts corresponding to said grooves in said frame member; said printed circuit providing leads from each of said contacts to associated connector means; and means maintaining said sliding contact members in engagement with associated ones of said printed circuit contacts dependent upon whichever of said two positions a contact member is in.

2. A two-position code switch bank as defined in claim 1, wherein a plurality of dielectric operating members are provided, each of which is independently connected to an associated one of said sliding contacts.

3. A code switching device comprising: a plurality of sliding members disposed for independent, parallel reciprocating movement between two limit positions, each sliding member being provided with a cutout portion; a plurality of contact members, one disposed in each of said cutouts; guiding means cooperating with each of said contact members for guiding said contact members in parallel relation upon reciprocation of said sliding members; a printed circuit plate disposed immediately adjacent said guiding means having contacts for each of said contact members, at least one of which is engaged in one position of a sliding member and at least another of which is engaged in the other position of said sliding member; and means urging said contact members into engagement with said printed contact plate.

4. A code switching device comprising: a plurality of sliding members disposed for independent, parallel reciprocating movement between two limit positions, each sliding member being provided with a cutout portion; a plurality of contact members, one disposed in each of said cutouts; guiding means cooperating with each of said contact members for guiding them in parallel relation upon reciprocation of said sliding members; a printed circuit plate disposed immediately adjacent said guiding means having contacts for each of said contact members, at least one of which is engaged in one position of a sliding member and at least another of which is engaged in the other position of said sliding member; said contact members being bridge contacts in the shape of a W, the ends of which provide sliding contacts and the center loop of which provides a spring anchor; independent spring means for each of said bridge contacts, connected to said center loops of said bridge contacts, urging said contact members into engagement with said printed contact plate; and an anchor device fixed relative to said printed contact plate providing anchorage for said spring means whereby all of said contact members are biased against said printed contact plate.

5. A multiple bank switching device comprising: a plurality of sliding members disposed for independent parallel reciprocating movement between two limit positions; a contact member held by each of said sliding members; guiding means for said contact members and said sliding members engaged with each of said contact members for guiding said contact members in parallel paths upon reciprocation of said sliding members; a dielectric plate disposed immediately adjacent said guiding means having at least two contacts for each of said contact members, at least one of which contacts is bridged in one position of a sliding member and at least another of which contacts is bridged in the other position of said sliding member; and means urging said contact members into engagement with contacts on said dielectric plate.

6. For use in a simultaneous keyboard transmitter: a two-position simultaneous switch bank including a plurality of sliding switch contacts, each including a dielectric connector means adapting said dielectric connectors to be operatively connected to a keyboard code member and to be independently positioned in one of two positions by a keyboard code member position; a guide device for said sliding contacts; and a plug-in printed circuit contact block having two fixed contacts for each of said sliding contacts plugged into said guide device and disposed in abutting relation to said sliding contacts.

7. A two-position simultaneous switch bank with a plurality of switches comprising: a base member with parallel grooves therein; a sliding contact member disposed for independent sliding movement in each of said grooves; a plug-in printed circuit having a plurality of pairs of aligned spaced contacts corresponding to said grooves in said base member; said printed circuit providing leads from each of said contacts to plug-in pins; said base member including independent terminal means receiving the pins of said plug-in printed circuit; and means maintaining said sliding contacts in engagement with associated ones of said printed circuit contacts.

8. A two-position simultaneous switch bank comprising: a base member with parallel grooves; a sliding contact member disposed for independent sliding movement in each of said grooves; a dielectric means, adapted to be connected to an operator, disposed in each of said sliding contact members; a plug-in printed circuit having a plurality of pairs of aligned spaced contacts and pins corresponding to the number of said grooves in said base member, said printed circuit providing leads from each of said contacts to associated plug-in pins; said base member including terminal socket means to receive said plug-in pins; and means for maintaining said sliding contacts in engagement with associated ones of said printed circuit contacts.

9. For use in telegraph communication equipment, a code switching device comprising: a plurality of sliding members disposed for independent parallel reciprocating movement between two limit positions, one edge of each sliding member being provided with a cutout; a bridge contact member having two contact ends carried in each of said cutouts; guiding means cooperating with each of said bridge contact members for slidably guiding them in parallel relation upon reciprocation of said sliding members; a printed circuit plate disposed immediately adjacent said guiding means having two pairs of contacts for each of said bridge contact members, one pair of which is bridged in one position of a sliding member and the other pair of which is bridged in the other position of said sliding member; and means urging said bridge contact members into engagement with said printed contact plate.

10. The switching device as defined in claim 9, wherein each of said sliding members includes means enabling cooperation with a locking member whereby the permutative combination of positions of said plurality of sliding members can be locked after said sliding members have been positioned.

11. For use in telegraph communication equipment, a code switching device comprising: a plurality of sliding members disposed for independent, parallel reciprocating movement between two limit positions, one edge of each sliding member being provided with a cutout; a bridge contact member having two contact ends disposed in each of said cutouts; guiding means cooperating with each of said bridge contact members for guiding them in parallel relation upon reciprocation of said sliding member; a printed circuit plate disposed immediately adjacent said guiding means having two pairs of contacts for each of said bridge contact members, one pair of which is bridged in one position of a sliding member and the other pair of which is bridged in the other position of said sliding member; said bridge contact members being in the shape of a W, the ends of which provides said sliding contacts and the center loop of which provides a spring anchor; independent spring means, associated with each of said bridge contacts, connected to said center loops of said bridge contacts; and an anchor device fixed relative to said printed contact plate providing anchorage for said spring means whereby all of said bridge contact members are biased against said spring contact plate.

12. A multiple bank switching device comprising: a plurality of sliding members disposed for independent parallel reciprocating movement between two limit positions; an electrical bridge member having two contact ends held by each of said sliding members; guiding means disposed between said bridge contacts and said sliding members engaged with each of said bridge contact members for guiding them in parallel paths upon reciprocation of said sliding members; a dielectric plate disposed immediately adjacent said guiding member having two pairs of contacts for each of said bridge contact members, one of each pair being bridged in one position of a sliding member and the other ones of each pair being bridged in the other position of said sliding member; and means urging said bridge contact members into engagement with contacts on said dielectric plate.

13. A switching device as defined in claim 12 wherein said bridge contact members are in the shape of a W, the ends of which provide said sliding contact ends and the center loop of which provides a spring anchor.

14. In a switch device combination: a shiftable two-position flat elongate plate having two ends and spaced apart side edges and with a cutout in one side edge adjacent one end; an operating member connecting means in one side edge of said flat plate adjacent to one end; a W-shaped metal rod disposed in said cutout with its two ends constituting contacts and projecting out of said cutout; and fixed contact means being selectively engaged by said contacts in said two positions.

15. A switch device comprising: a flat elongate plate having a cutout in one of its edges and an operating member connecting means in one of its edges; a W-shaped metal rod disposed in said cutout with its two ends constituting contacts and projecting out of said cutout; guide means providing a sliding path of movement for said flat plate and metal rod parallel to the lengthwise axis of said flat plate; fixed contact structure disposed adjacent said projecting contacts; and means biasing said projecting contacts against said contact structure.

References Cited by the Examiner

UNITED STATES PATENTS

| | | | |
|---|---|---|---|
| 2,513,172 | 6/50 | Hassay | 200—162 |
| 2,740,097 | 3/56 | Edelman | 317—101 X |
| 2,825,036 | 2/58 | Sorensen | 339—17 |
| 2,849,700 | 8/58 | Perkin | 339—198.41 |
| 2,864,554 | 12/58 | Ralph et al. | 200—16 |
| 2,964,986 | 12/60 | Johnson | 200—5 |

ROBERT K. SCHAEFER, *Acting Primary Examiner.*

MAX L. LEVY, BERNARD A. GILHEANY, *Examiners.*